July 31, 1951 W. E. URSCHEL 2,562,400
MECHANICAL MOVEMENT AND CROP TREATING MECHANISM
Filed May 12, 1943 8 Sheets-Sheet 6
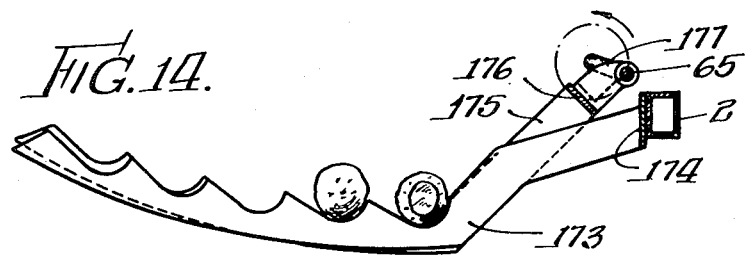
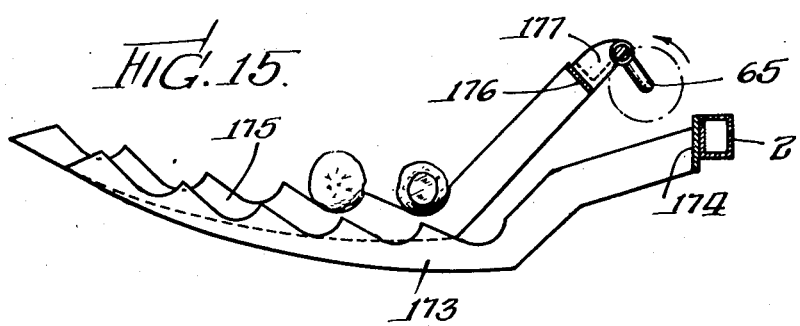
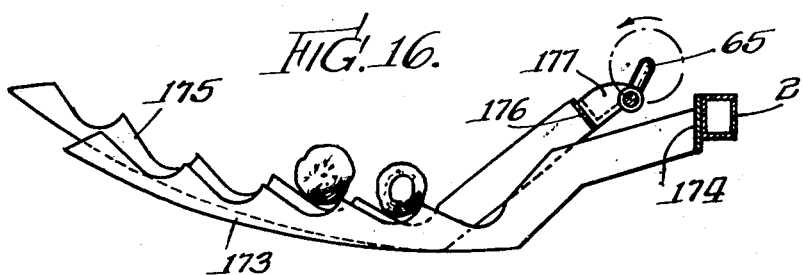
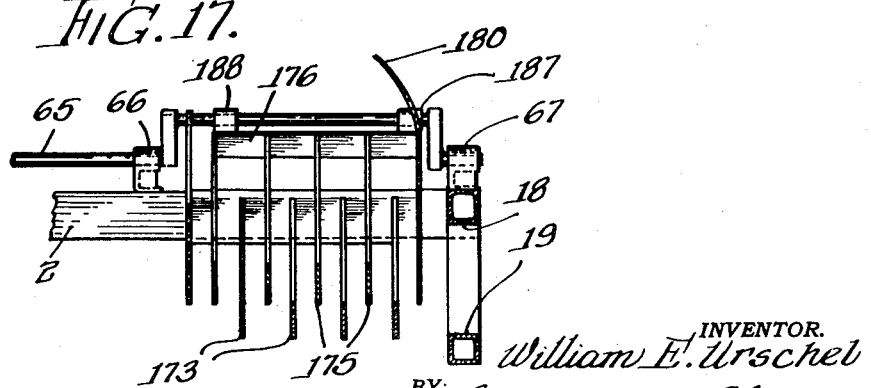
INVENTOR.
William E. Urschel
BY Loftus, Moore, Olson &
Trexler ATTORNEYS

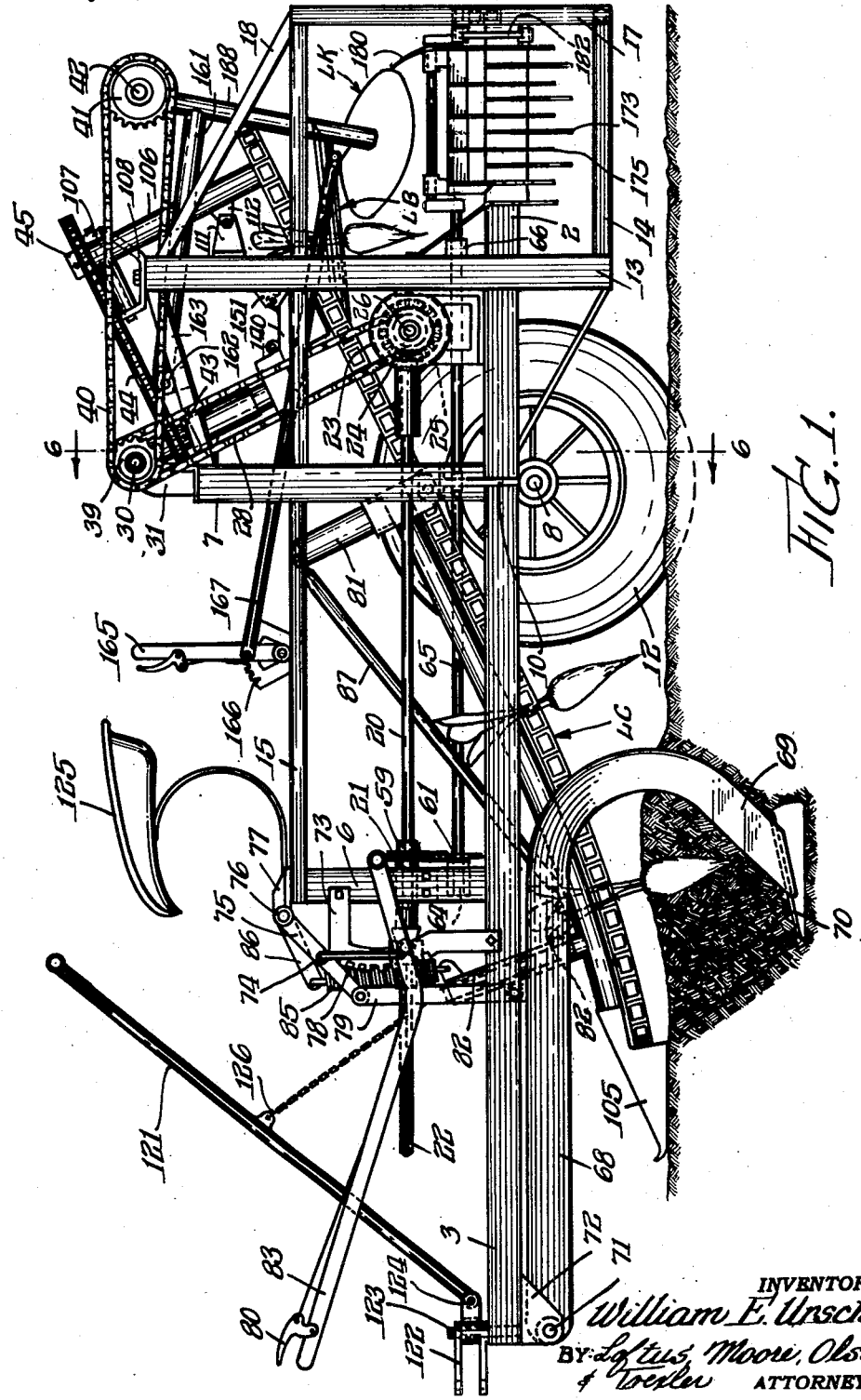

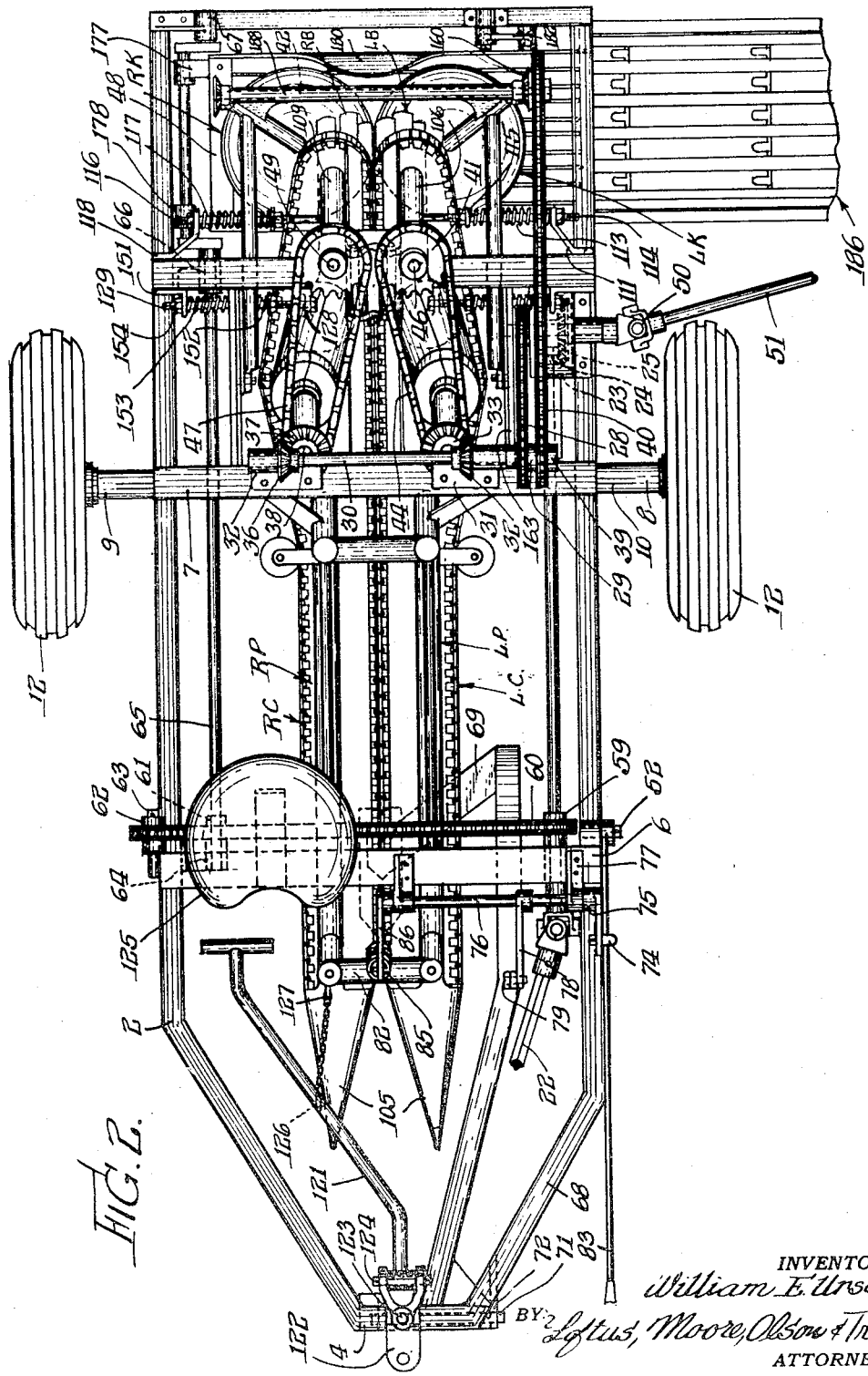

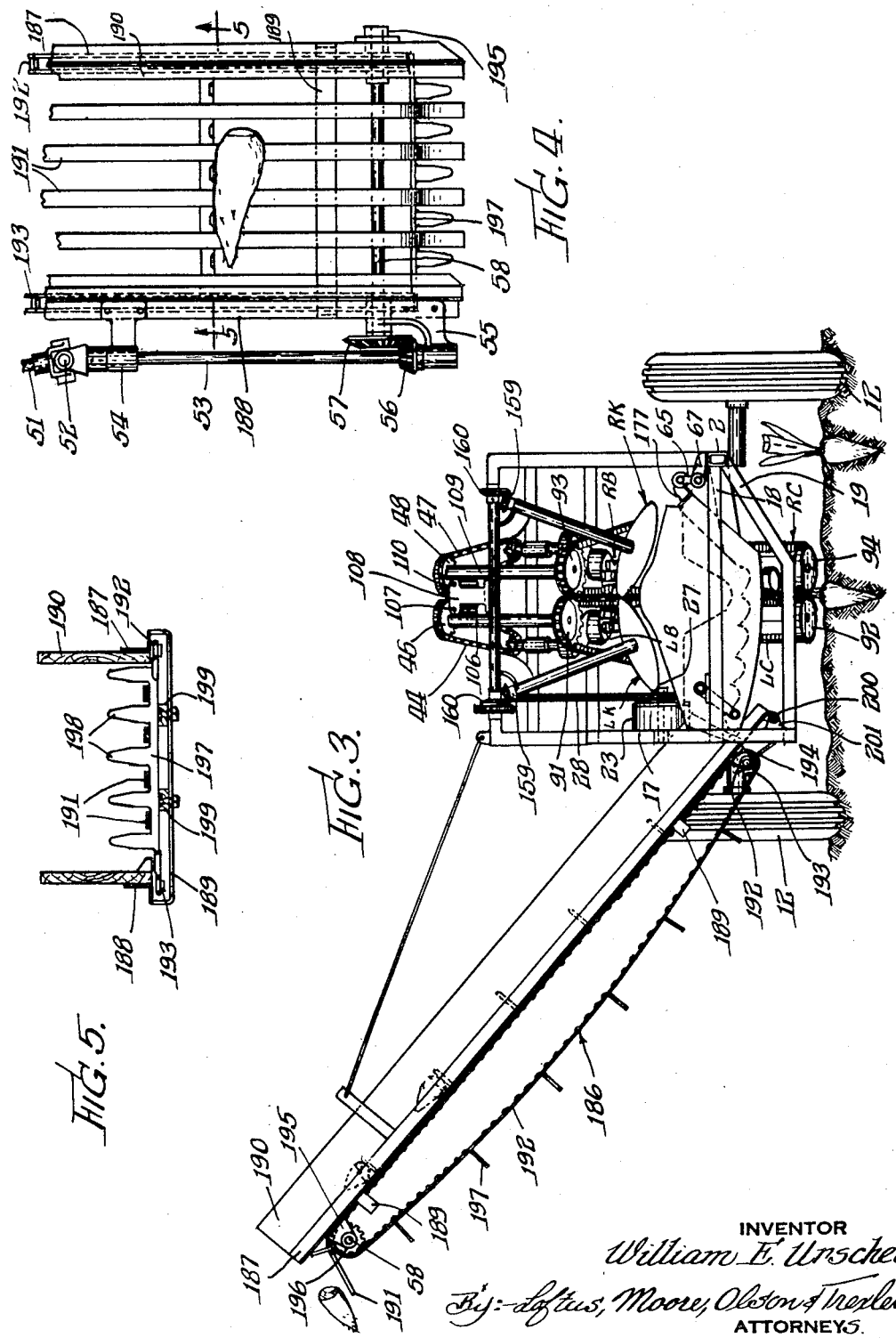

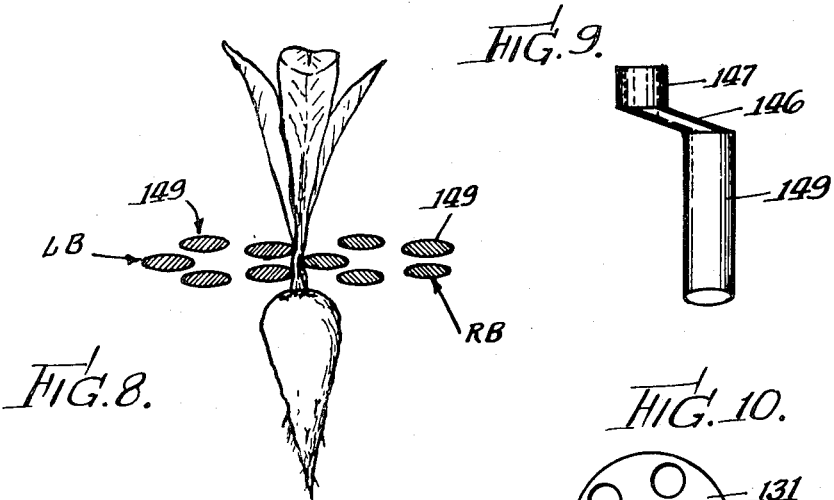
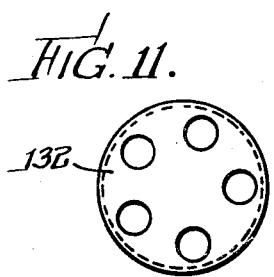
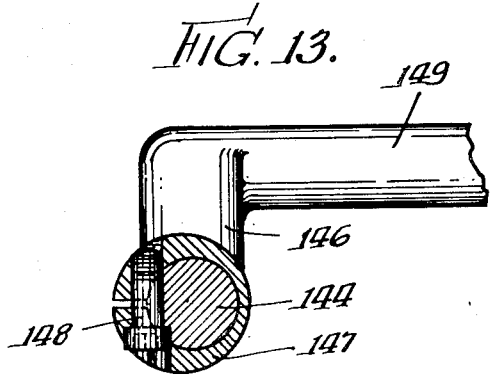

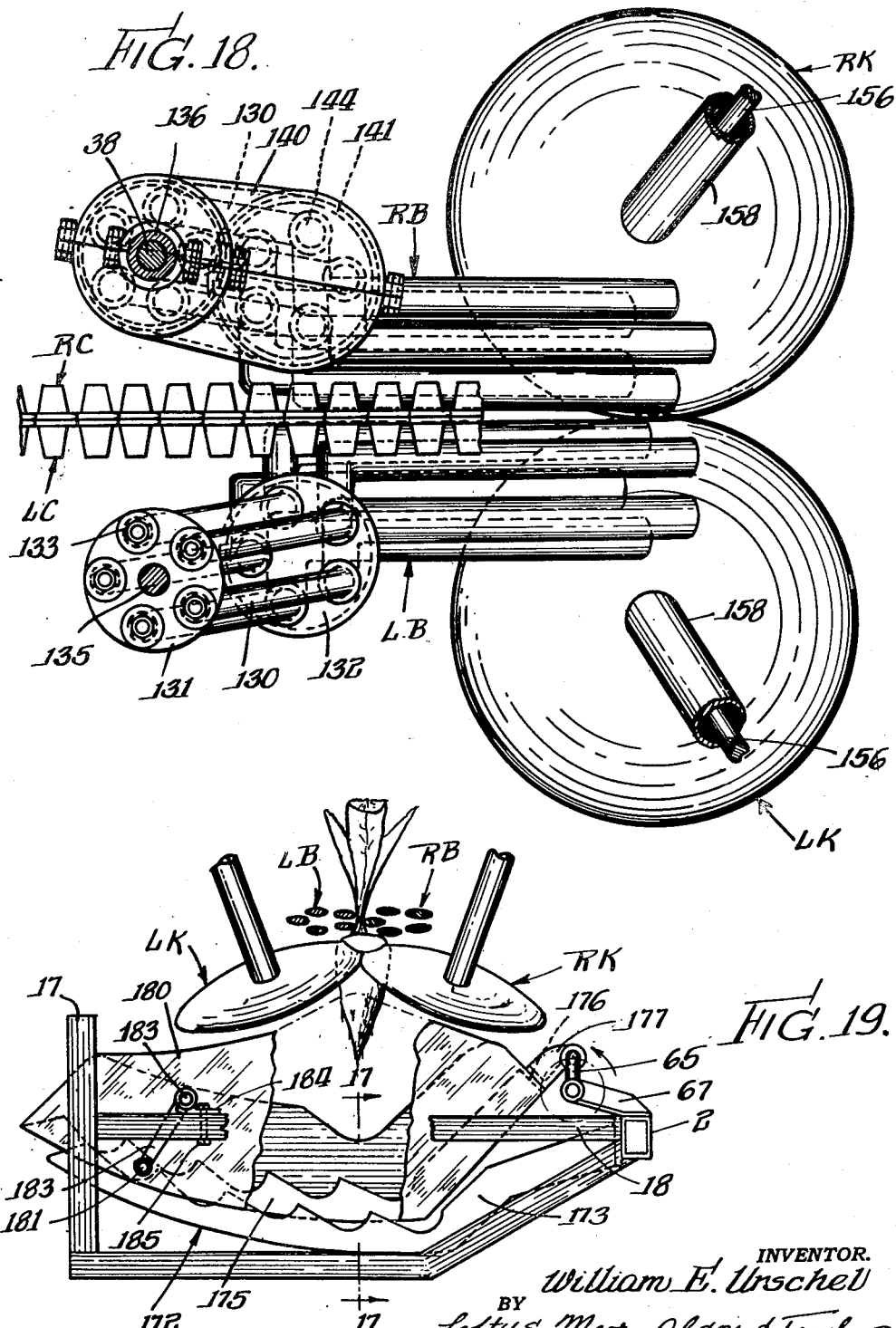

July 31, 1951 W. E. URSCHEL 2,562,400
MECHANICAL MOVEMENT AND CROP TREATING MECHANISM
Filed May 12, 1943 8 Sheets-Sheet 8
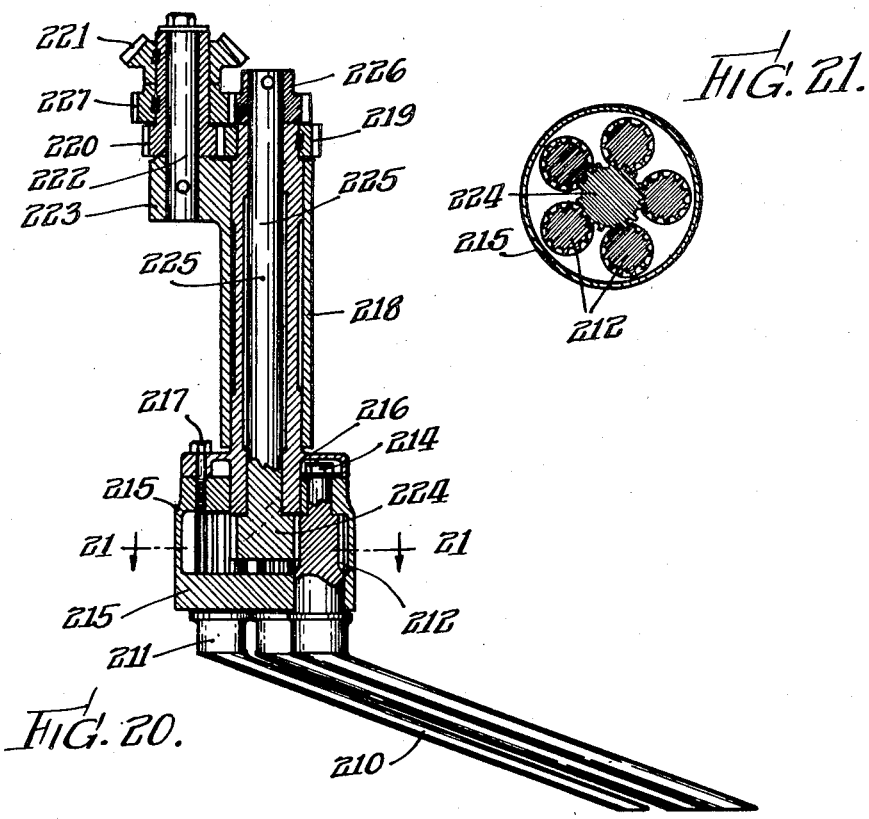
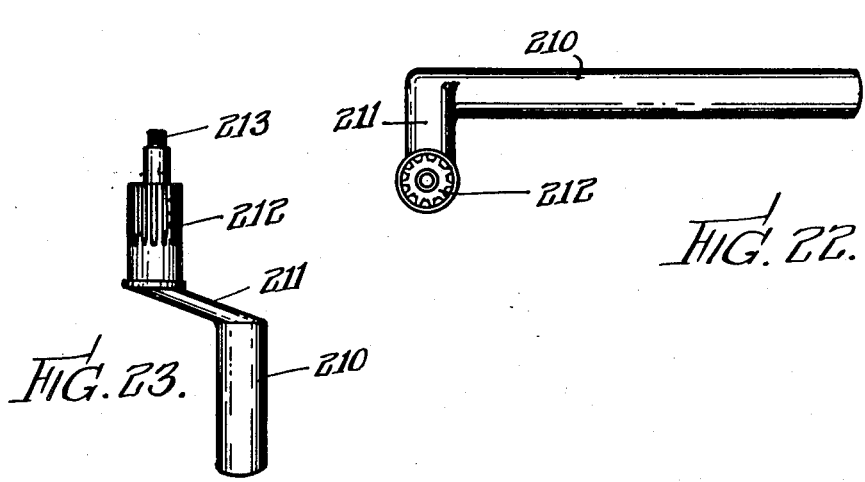
INVENTOR.
William E. Urschel Patented July 31, 1951

2,562,400

UNITED STATES PATENT OFFICE 2,562,400

MECHANICAL MOVEMENT AND CROP TREATING MECHANISM

William E. Urschel, Valparaiso, Ind.; Joe R. Urschel administrator of said William E. Urschel, deceased Application May 12, 1943, Serial No. 486,680

16 Claims. (Cl. 198—218)

This invention relates to mechanical movements capable of a multitude of adaptations; and in particular is peculiarly adapted for use in crop treating mechanisms wherein squeezing and/or pulling action between two relatively shiftable members is desired whereby to pull or feed crops in a predetermined direction relatively to said members in a direction which involves both a feeding movement longitudinally of the members, as well as generally transversely thereof.

The present invention, while capable of other adaptations, is peculiarly an improvement upon the construction shown in my Reissue Patent 20,151, of October 27, 1936, as well as my Patent No. 1,894,802, of January 17, 1933. In addition, the invention is capable of adaptation to constructions shown in some of my pending applications relating to crop treating instrumentalities. I have disclosed the invention in connection with so-called roller bar units disposed in the path of a crop for positioning the crop in predetermined relation with cutting means for separating the crop from the foliage. The roller bars themselves, while entirely satisfactory in operation, have heretofore been of such construction that it was difficult to prevent dirt and leaves from clogging or getting into the bearings at one end of the roller bars. So also in the prior devices, due to the distance between the bearings which support the front and rear roller bar heads, it has been difficult to maintain the bearings in alignment. Therefore in the prior devices it was necessary to provide a supporting head to support the rear roller bar head bearing, and this in turn prevented the severed top of the crops from discharging freely from the machine so that the foliage tended to wrap about the rear roller bar head and clog up the machine.

The present invention provides roller bars or elongated parallel members in which the rear end of the roller bar has no supporting head; in short, the rear ends of the roller bars are free of any support, that is, they are supported at one end only and are free from said supported length, throughout the entire length of said elongated members whereby the severed foliage or other crop is capable of passing freely from the ends of the roller bar, thereby eliminating any tendency for the bars to clog with dirt or other foliage. In addition, in the present construction the roller bars are constructed in such a manner that an enclosing dust-proof casing or housing is provided which naturally lengthens the life of the roller bar unit. In addition, the roller bar is provided with bearings at its front end which maintain the roller bars in alignment at all times.

Therefore, among the objects of the present invention are to provide a roller bar construction which is driven and supported at one of its ends and is completely unsupported from such supported end to its other free end, whereby to facilitate the discharge of the crop as it is fed through the roller bar; to provide an enclosing dust and dirt proof housing for the driven end of the roller bar; to provide an improved bearing and driving mechanism for the front end of the roller bar whereby the roller bars are held in positive alignment and are sealed against the penetration of dust and dirt and may be easily lubricated.

Yet another object of the present invention is to provide a new and improved mechanical movement for various adaptations.

Yet another object of the invention is to provide a new and improved means for conveying the crop and removing the dirt therefrom while being conveyed.

Another object of the invention is to provide means for guiding the lifting and pulling means and for controlling the height of the pulling means.

A further object of the present invention is to provide means for shifting the entire chassis of the front part of the machine whereby to register both the plow and the crop pulling or lifting mechanism whereby to maintain these elements in alignment with the row of plants being operated upon.

Still another object resides in providing a single control member which not only positions the front part of the machine laterally to line up the plant lifting means and the plant pulling means with the crop row, but which also by an additional movement raises and lowers only the plant pulling means and does not disturb the crop lifting means.

These and other objects of the invention will be apparent from a perusal of the following specification when taken in connection with the accompanying drawings, wherein:

Figure 1 is a side elevation of one exemplification of the invention, to wit an adaptation of the invention as applied to a machine for harvesting sugar beets, and wherein the wheel and elevator have been removed to facilitate disclosure.

Figure 2 is a plan view of the harvester shown in Figure 1.

Figure 3 is a rear view of the harvester.

Figure 4 is a fragmentary plan view of the upper portion of the harvester.

Figure 5 is a cross section of the harvester taken on the line 5—5 of Figure 4.

Figure 8 is a cross section of the roller bars with one of the beets being fed along thereby.

Figure 9 is a rear view of a single roller bar.

Figure 10 is a plan view of an upper roller bar head.

Figure 11 is a plan view of the lower roller bar head.

Figure 12 is a side view of a roller bar crank.

Figure 13 is a sectional view of the forward end of the roller bar taken on the line 13—13 of Figure 7.

Figures 14, 15 and 16 are successive diagrammatical views of the shaker conveyor showing the progressive action of the shaker slats.

Figure 17 is a sectional view of the shaker conveyor taken on the line 17—17 of Figure 19.

Figure 18 is a plan view of a modified form of roller bar unit with the crank housing removed on one side.

Figure 19 is a rear view of the shaker conveyor.

Figure 20 is a sectional view of a geared roller bar, the same being a modification of the construction shown in Figure 7, which construction may be used in the harvester or in other adaptations of the invention.

Figure 21 is a section taken on the line 21—21 of Figure 20.

Figure 22 is a plan view of a geared roller bar.

Figure 23 is a rear view of a geared roller bar.

Figure 6:
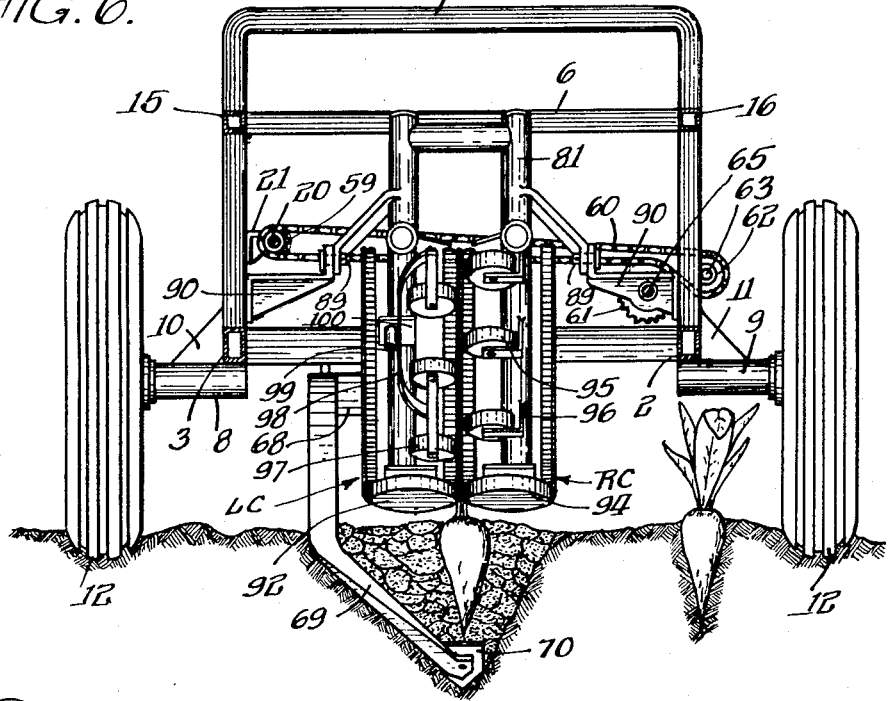
Figure 6 is a rear sectional view of the harvester taken on the line 6—6 of Figure 1.

For purposes of exemplification of the invention, but not by way of limitation, I have shown one form of the invention as applied to a machine for harvesting beets, and referring particularly to Figures 1, 2, 3 and 6, these show that the machine comprises a main frame including two preferably rectangular hollow steel members 2 and 3 arranged in parallelism and having inwardly bent forward portions secured at their ends to a short transverse member 4, as seen in Figure 2. The machine to which this invention applies in a sense is somewhat like the construction shown in my Beet Harvester application, Serial No. 377,639, filed February 6, 1941 now Patent No. 1,802,179. The frame is joined preferably by welding. Side members 2 and 3 are held in spaced relation by an inverted U-shaped piece 6, see Figure 2, which also serves as a support for the plow, the pullers and the controls therefor. As shown in Figures 1 and 6, rearwardly of cross frame 6 is another inverted U-shaped piece 7, welded to the side members 2 and 3. This U-shaped member 7 provides a support for the rear end of the puller frames, the roller bars, and also serves to strengthen the frame at the point where the stub axles 8 and 9 are welded to the side frame members 2 and 3 as shown in Figure 6. The stub axles 8 and 9 are welded to the side frame members 2 and 3 directly below the point where the legs of the U-shaped member 7 are welded. Triangular braces 10 and 11, preferably of plate steel, are welded between the stub axles 8 and 9 and the side members 2 and 3 to provide a rigid mounting for the ground wheels 12. The ground wheels are rotatably mounted on the stub axles 8 and 9. Further rearwardly is another inverted U-shaped frame 13 welded to the side members 2 and 3. This U-shaped member 13 provides a support for the rear puller sprockets and their drive. At the lower end of the left leg of the U-shaped piece 13 is welded the square tubular member 14 which extends rearwardly to the vertical piece 17 to which it is welded. To strengthen the frame, a brace 18 is welded between the upper end of vertical piece 17 and the U-shaped piece 13, see Figure 1. At the rearmost end of side member 2 are welded the two transverse members 18 and 19 which are also welded to the vertical member 17, as shown in Figure 3. A square tubular member 15 welded to the upper portion of the U-shaped member 6 extends rearwardly and is welded in turn to the U-shaped members 7 and 13 and the vertical piece 17. Similarly, another square tubular piece 16 is welded to the corresponding members on the opposite side of the frame. These members 15 and 16 act as braces to strengthen the frame.

The transmission mechanism for the various parts will now be described. A main drive shaft 20 is journalled at its forward end in bracket 21, bolted to the U-shaped frame member 6 and at the rear end is journaled in the gear housing 23 which is bolted to the side member 3 and the U-shaped frame 13, see Figures 1 and 2. This drive shaft 20 is driven by the power take-off shaft of the tractor through the conventional type of universal joint assembly 22. The forward end of this universal joint assembly is secured on the splined take-off shaft of the tractor and the other end is pinned or keyed to the drive shaft 20. Thus rotative power is transmitted to the shaft 20 by the tractor which likewise pulls the harvester along the row of sugar beet plants to be harvested. On the rearmost end of drive shaft 20 within the housing 23 is keyed the bevel pinion 24 which drives the bevel gear 25. This bevel gear 25 is keyed on shaft 26 which is journaled in the gear housing 23. At the right end of shaft 26 which projects out of the housing 23 is securely mounted a sprocket 27, see Figure 3. This sprocket 27 drives a sprocket 29 through chain 28. Sprocket 29 is keyed to the transverse shaft 30 journaled in the bearing brackets 31 and 32 which are bolted to the U-shaped piece 7 as shown in Figure 2. Bevel gear 31 secured on shaft 30 drives bevel gear 34 which is keyed to the left roller bar drive shaft 35. Similarly, the bevel gear 36 keyed on shaft 30 drives bevel gear 37 which is keyed to the right roller bar drive shaft 38. Sprocket 39 secured to shaft 30 drives sprocket 41 through the chain 40. Sprocket 41 is keyed to the cutter drive shaft 42. Directly below bevel gear 34 and pinned to the left roller bar drive shaft 35 is a sprocket 43 which drives chain 44. This chain drives sprocket 45 which is pinned to left puller drive shaft 46. Similarly a sprocket pinned to the right roller bar drive shaft 38 drives chain 47 which in turn drives sprocket 48 pinned to the right puller drive shaft 49.

Referring to Figures 1 and 6, a sprocket 59 is keyed on shaft 20 near its forward end adjacent bearing bracket 21. This sprocket 59 drives chain 60 which drives the sprocket 61. The chain 60 is guided to drive sprocket 61 in the proper direction by an idler sprocket 62 which is rotatably mounted on stud 63. This stud is secured to the U-shaped frame 6. Sprocket 61 is secured to the shaker conveyor crankshaft 65 which is journaled at its forward end in bearing bracket 64, secured to U-shaped frame 6 and at the rear in bearing bracket 66 secured to U-shaped piece 13. The rearmost end of the crankshaft 65 is journaled in the bearing bracket 67 which is attached to the rear transverse member 18.

Referring to Figure 2, a universal joint 50 is secured to the left end of shaft 26 which projects out of the gear housing 24. Shaft 51 secured to the universal joint 50 extends to the upper end of the elevator and drives shaft 55 through the universal joint 52, see Figure 4. Shaft 53 is journaled in the bearing brackets 54 and 55. Bevel pinion 56 secured to shaft 53 drives bevel gear 57 which is keyed to the elevator drive shaft 58.

A crop lifter is provided to assist the puller mechanism in pulling the embedded crop from the soil. This lifter is arranged to run in the ground under the crop for lifting it and for breaking up the soil about the crop so that the latter may be easily raised from the soil by the puller mechanism.

Referring now to Figures 1, 2 and 6, the crop lifter will be seen to consist of a substantially horizontal beam 68 having at its back or rear end a spur section 69 turned laterally downwardly and forwardly in support of a forwardly directed shovel 70. The beam is pivotally connected at its forward end with pin 71 which is carried in the brackets 72 attached to the transverse frame member 4. Means is provided for adjusting the depth at which the crop lifter shall be maintained and this consists of a vertical link 79 which at its upper end is pivotally connected with the forward end of arm 78. This latter arm is fixed upon a cross shaft 76 that is journaled in a plurality of bearing members 77 attached to the U-shaped piece 6. A second arm 75 fixed to the shaft 76 is connected by means of link 34 with an operating lever 83. This lever 83 is pivotally connected with the machine frame through a pin 52. The arrangement is such that an operator while in the driver's seat of a tractor may grasp the end of the lever 83 which together with the conventional finger grip 80 for releasing the lever 83 from the cooperating segment 73 will then pivot said lever 83 to change the elevation of the lifter of plow shovel 70.

Means is likewise provided for grasping the leafy portions of the soil embedded crop, for gradually pulling the crop upwardly free from the soil and for conveying the crop to cutting means for severing the crown portion of the crop, and for discharging the severed portions into a conveyor so that the recovered severed crop portions may be disposed at a desired point with the leafy portions, and the severed crown portions may be discharged at another remote point and free from the machine.

Referring now to Figures 1, 2 and 6, the puller mechanism comprises right and left puller frames designated RP and LP. These puller frames are supported at their upper or rear ends by a rear arch bracket 81 to which the puller frames are welded. The puller frames project downwardly and forwardly as shown in Figure 1. At the lower ends, these puller frames are suspended by a front or lower arch bracket 82 which is also welded to the puller frame. This frame arch bracket 82 is supported by a helical spring 85 which depends from the free end of arm 86, see Figure 1, and which arm has its opposite end fixed on shaft 76. This arm 86 is controlled by the manually operated lever 83 which also controls the plow as heretofore described. By supporting the front end of the pullers by the spring 85 the front end of the pullers may slide easily over any obstructions and follow the uneven contours of the ground.

The rear end of these same puller frames are supported by the rear arch bracket 81. Braces 87 secured to the upper portion of the bracket 81 project forwardly to the lower ends of the puller frames and are secured thereto by bolts 88, see Figure 1. This construction strengthens the puller frames. Referring now to Figure 6, this rear arch bracket 89 is swingable about a horizontal axis, and to this end is pivotally mounted on the left side on the pin 89 which is secured in the bracket 90, attached to the U-shaped member 7. The right side of the rear arch bracket 81 is pivotally mounted on pin 89 secured in the bracket 90 which is bolted to the U-shaped piece 7. This construction allows the puller frames to move up and down as directed by the hand lever 83, and likewise permits the pullers to follow the contour of the ground.

Each of the puller frames carries an endless puller chain designated RC and LC. The chain LC is carried upon a drive sprocket 91, see Figure 3, and rides about a lower idler wheel 92. Similarly, chain RC is driven by sprocket 93 and rides about a lower idler wheel 94. As shown in Figure 6, the puller frame RP supports a plurality of idler wheels 95 by the brackets 96. These idlers 95 guide the chain LC in its proper path. The puller frame LP carries a plurality of idlers 97 which bear outwardly against the inner side of the working flight of the puller chain LC. The idlers 97 are yieldingly pressed outwardly against their associated puller chain by the leaf spring 98 which is pivotally mounted on stud 99 secured in plate 100. This plate is welded to the puller frame LC.

The puller frames RP and LP have at their lower ends skid shoes 105 for sliding along the surfaces of the ground to maintain the puller chain in the proper position to grasp the leaf portions of the crop. These skid shoes 105 terminate with a pointed portion which guides the leaf portion of the crop between the right and left puller chains. Referring now to Figures 1, 2 and 3, the drive sprocket 91 of the left puller is secured to and driven by shaft 46 which is journaled in the bearing bracket 106. This bearing bracket 106 is pivotally mounted on a pin 107 which is secured in the bracket 108 bolted to the rear U-shaped member 13. Similarly, drive sprocket 93 of the right puller is secured to and driven by shaft 49, journaled in the bearing bracket 109, which is pivotally mounted on pin 110, likewise secured in the bracket 108. Means is provided for resiliently urging the rear drive sprockets together. Referring to Figures 1 and 2, near the lower end of bracket 106 is an ear 112 in which a spring rod 114 is secured. This spring rod 114 extends outwardly and is reciprocally mounted in the bracket 111 which is welded to the rear U-shaped frame 13. A compression spring 113 is mounted on spring rod 114. Nut 115 on spring rod 114 adjusts the tension of spring 113. In a like manner, bracket 109 has an ear which holds the spring rod 116. This spring rod is reciprocally mounted in the bracket 118 welded to the rear U-shaped frame 13. Thus, the drive sprockets 91 and 93 are urged together by the springs 113 and 117. As the bearing brackets 106 and 109 are pivotally mounted on the pins 107 and 111, the sprockets 91 and 93 may move laterally against the urge of the spring 113 and 117, to discharge any foreign material which may be picked up by the puller chains and to compensate for the varying density of the crop foliage.

Single control means is provided for registering with the plant row being harvested, both the crop lifting mechanism, to wit the plow, and the puller frames. In addition, this mechanism is arranged so that the same manually controlled operation can be actuated to raise only the puller frames without laterally shifting the plow and the puller frames, for purposes of alignment with the crop row. To this end I provide a manually operated guiding bar 121. As shown in Figures 1 and 2, there is provided a clevis 122 which is adapted to hinge on that drawbar of the tractor which pulls the harvester along the crop row. This clevis is pivotally mounted on a pin 123 which is mounted in the member 4 at the front of the frame. The manually operated guide bar 121 is in turn hinged to the clevis 122 by means of the pin 124. A seat 125 is secured to the front U-shaped member of the harvester so that the operator sitting in the seat may, by moving the guide bar 121 to the right or left, correspondingly laterally shift the entire frame of the machine in the desired direction whereby to effect a lateral adjusting movement of not only the crop lifter but also the puller frames to cause them to follow lateral deviations of the crop row in the ground. Furthermore, this same guide bar is constructed so that it can raise the puller frames without laterally moving the puller frames and plow, in order to prevent the body of any crop that projects abnormally high from the surface of the ground from entering between the puller chains. To this end a chain 126 depends from the guide bar or manual operator, and is attached to the front edge support of the pullers by means of the ear 127. With this arrangement the operator, as the pullers approach a high crop, by raising on the guide bar can raise the front end of the pullers high enough for the puller chains to engage the foliage of the crop at the proper position. In addition, due to the suspension of the front end of the pullers by the helical spring 85, the pullers may be easily raised to the desired position. After the puller chains have engaged the foliage of the high crop the operator then lowers the guide bar 121 and the pullers return to normal operating position.

Figure 7:
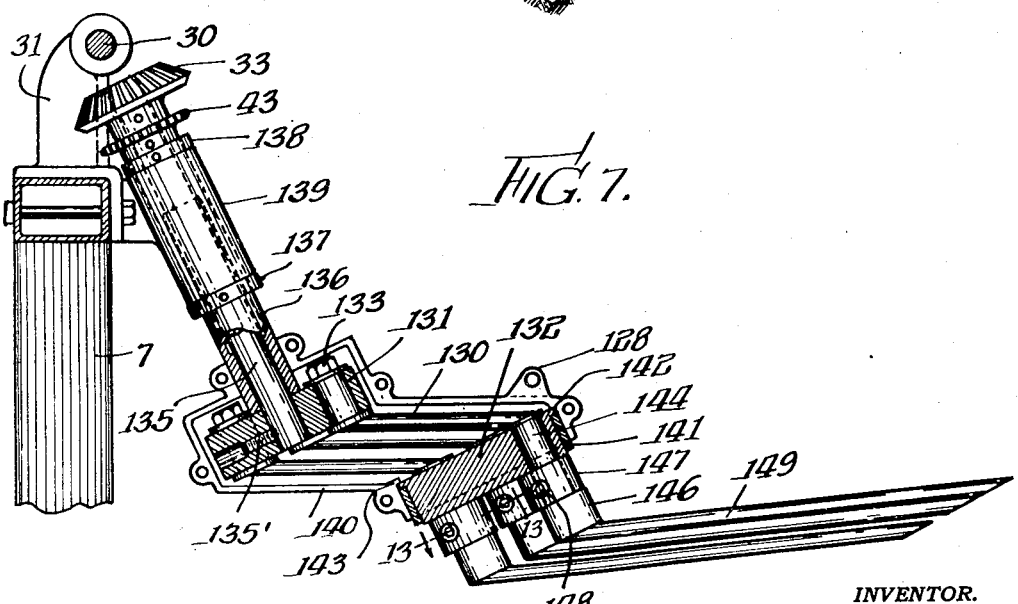
Figure 7 is a side view partly in section of the preferred form of roller bar assembly with one half of the dust-proof housing removed to show the roller bar cranks.

The new mechanical movement forming one of the objects and features of this present application is herein shown in a specific adaptation as means for properly positioning each one of the crown portions of the sugar beets as they are carried along by the conveying means, relatively to the severing cutters which sever the crown portion of the beet from the foliage, and the improved mechanism is arranged so that the severed foliage may slide freely from the free ends of the roller bars without clogging the same with dirt or leaves. In addition, by the construction of the housing around the operating or driving portion of the improved puller bars, all dirt is excluded and the puller bars are kept in parallel alignment at all times during their operation and are capable of being easily lubricated. To this end, mounted below and toward the rear of each puller chain is a crop positioning means for transfering the crop into predetermined relation with the cutting mechanism. As shown in Figures 1, 2 and 19, this positioning means comprises, in the adaptation shown, a pair of complemental sets of roller bars designated as RB and LB. Referring now to Figures 7 to 12 inclusive, each roller bar set is driven by a plurality of cranks 130, one crank being provided for each bar of the set. These cranks 130 are disposed between a driving head bearing block 131 and an idler bearing block 132. The cranks are journaled at their driven ends in bearings spaced equidistantly from the center of the driving head 131 and at their other ends in bearings spaced equidistant from the center of the idler bearing block 132. The distances at which the bearings in the drive and idler bearing blocks are spaced from the center of these bearing blocks are equal. The cranks are retained in their bearings of the drive head bearing block 131 by the washers and nuts 133 on the thread portions 134 of the various crank heads 133. This drive head bearing block 131 is secured on the drive shaft 135 by the set screw 135'. This drive shaft 135 is journaled in a sleeve 136 pivotally mounted in a bearing 139 of the fixed bracket 31 and is retained therein by collars 137 and 138. The cranks 130 and their bearing blocks 131 and 132 are enclosed in a housing 140 comprising two preferably similar sections secured together by bolts. This dust and dirt proof housing 140 is in turn supported on the sleeve 136 and securely clamped thereon by bolts which hold together the two sections of the housing 140. Clamped securely in the lower portion of the housing 140 is a bearing ring 141 which provides a bearing for the idler bearing block 132. Referring to Figure 7, this idler bearing block 132 has a flange 142 disposed in a groove formed between the bearing ring 141 and the lip 143 of the housing 140, which construction prevents axial movement of the idler bearing block 132. The pin 144 of each crank 130 has a portion which extends below the idler bearing block 132 and on which the roller bars, as shown in Figures 7, 9 and 13, are mounted. Each roller bar has an outwardly bent portion 146 which terminates in a split hub or bearing head 147, which hub is securely clamped on the crank pin 144 by a cap screw 148. This cap screw engages the notch 145 in the pin 144 to prevent the roller bar from turning on and relatively to the pin 144. The opposing or other section of roller bars is of similar construction and therefore need not be further described.

From the foregoing description it is evident that because of the offset relation between the bearing blocks 131 and 132 and the inclination of the cranks 130 extending therebetween, every point on any one of the cranks will travel in a circular path lying in a plane intersecting the bars and extending at right angles with respect to the axis of rotation of said bearing blocks 131 and 132. The cranks 130 move with an elliptical component in a plane intersecting the cranks themselves at right angles. However the movement of the crank includes also a longitudinal somewhat reciprocatory component movement during the circulation of the cranks about each other. And inasmuch as the elongated roller bars or conveyor members 149 are individually secured to and guided by their cooperating cranks, the roller bars will circulate about each other in an identical manner to that in which the cranks circulate about each other. Thus when viewed from the top, the left set of roller bars move in a clockwise direction, while the right hand set of bars move in a counterclockwise direction. Hence when the foliage of a root crop is engaged between the two sets of roller bars the foliage of the crop is moved upwardly and also rearwardly between the roller bar section until the body of the crop comes in contact with the lowermost sections of the continuous roller bars or conveyor members 149. The feeding movement of the foliage in general will follow the direction of the dotted line shown through the roller bars in Figure 7. Hence it will be seen that there is a feeding movement of the foliage not only in the direction toward the roller bars, looking from the bottom of Figure 7, but also there will be the feeding component longitudinally of the bars in a direction toward the right of Figure 7. As a crop is thus fed through the roller bars the body of the crop is conveyed rearwardly to the cutting means. All of the beets are thus presented to the cutting means with the tops of their root portions in the same plane, due to the fact that the two sets of bars are so spaced as to create only enough pulling effect on the crop to permit it to be drawn upwardly but not sufficiently to break the foliage from the crop. In this manner the vertical pulling action of the bars on the foliage of the crop is just enough to hold the tops of the body of the crop in the same plane in close proximity to the lower portions of the contiguous sets of bars. Meanwhile the lateral conveying action of the bars presents the crop to the cutting means while the crop is held in the above mentioned manner, thereby assuring an even cut through the crown of the crop.

The roller bar sets RB and LB just described, are resiliently held in close proximity by resilient means. As shown in Figures 1 and 2, an ear 128 projects upwardly from the crank housing 140 and holds a spring rod 129 which extends outwardly to the bracket 151 welded to the U-shaped frame 13. The spring rod 129 is reciprocally mounted in a bracket 151 and has a nut 154 which limits the inward movement of the roller bars and provides means for adjusting the space between the two roller bar sets. A helical spring 153 on rod 129 urges the roller bars inwardly. The pressure spring 153 is adjusted by the nut 152 on the spring rod 129. By a like arrangement of parts the opposing roller bar set is also spring urged inwardly. From the previous description it will be noted that the roller bar sets are pivotally mounted at their forward ends so that as a result of this construction any incompressible material picked up by the puller chains will not damage the roller bar units because the springs will permit the roller bar sets to spread apart and pass the material from the machine.

The cutting mechanism is composed of two rotary cutting discs RK and LK and is pivotally mounted under the roller bars. Figures 1, 2 and 3 show the disc knives RK and LK secured to their respective drive shafts 156 and 157, which shafts are journaled in the knife bracket 158. Bevel gears 159 are secured at the upper end of each knife drive shaft 158. These bevel gears are driven by bevel gears 160 secured to the opposite ends of the shaft 42. (See Figure 2.) This shaft 42 is journaled in the knife bracket 158 and is driven by sprocket 41 from chain 40, see Figure 1. Arms 161 on each side of the knife bracket 158 extend forwardly and are pivotally mounted on the pins 162 which are secured in cars projecting from the frame members 163. These frames are welded between the U-shaped frame pieces 7 and 13. By pivoting the knife bracket the amount of the body of the crop which is cut away with the foliage may be varied. The position of the knives is controlled by a conventional hand type lever 165. This lever has a coacting segment 166 which is mounted on the frame member 15. Lever 165 is connected to the knife bracket 158 by the linkage 167. Any desirable means for adjustably pivoting the knives may be utilized instead.

Means is provided for shaking the dirt from the beets and separating the loose dirt from the crop and for advancing the dirt-free crop to the elevator. To this end I prefer the novel arrangement of shaker conveyor 172. The shaker conveyor has a plurality of stationary bars or slat members 173 which are all held apart in spaced relation on the right side by a bar 174 to which stationary slats are welded. The bar 174 is bolted to the side frame member 2. Positioned parallel to and between the slats 173 is a plurality of reciprocating slats 175 which are welded to a bar 176. Bearing brackets 177 and 178 bolted to this bar 176 are rotatably mounted on a crankshaft 65 which supports the right end of the reciprocating section of slats. Also secured to the bar 176 is a rear shield member 180 which extends across the rear of the shaker conveyor and confines the beets within the shaker conveyor. The left side of the reciprocating section of slats is supported by an arm 182 pivotally mounted on the stud 183 which is secured in the bracket 184 bolted to the rear frame member 18. The lower end of arm 182 is pivotally mounted on the stud 181 which is fixed in shield member 180. When the beets fall into the shaker conveyor, they are shaken and tumbled about to loosen the dirt adhering to their roots. The dirt and any loose leaves fall between the slats and are separated from the crop. As the crop is being shaken and tumbled about, the crop is also being conveyed to the elevator as shown in the diagrammatical views, see Figures 14, 15 and 16. The slats have notches in their upper edges. As the reciprocating section of slats moves in the direction indicated on the above-mentioned views, the notches engage the crop and the crop is raised and moved toward the elevator. As the reciprocating slats continue movement, the crop is lowered and engaged by the notches in the stationary slat which prevents the crop from rolling away from the elevation. On further movement, the reciprocating section of slats move lower and away from the elevator and as the cycle of movement is completed, the reciprocating slats again raise and engage the beets and move them toward the elevator. Thus, the crop is shaken free from soil and progressively conveyed to the elevator 186 which is positioned to receive the crop.

Referring now to Figures 3, 4 and 5, the elevator has the two parallel side angles 187 and 188 which are held in spaced relation by the U-shaped cross pieces 189. Side boards 190 secured to the side angles 187 and 188 confine the crop within the elevator. The floor of the conveyor is made up of a plurality of bars 191 spaced apart and parallel to the side angles 188 and 187. The elevator bars are secured at their lower ends to a cross rod 200 which is welded between the side angles 187 and 188 at their lower ends and pivotally mounted in the brackets 201. At the lower end of the elevator are the idler sprockets 192 and its mating sprocket which are rotatably mounted on shaft 193. This shaft is secured in the brackets 194 bolted to the side angles 187 and 188. At the upper end of the elevator is the drive shaft 58 journaled at the rear in bearing bracket 195 and at the front in the bearing bracket 55. The elevator drive sprockets 196 are keyed to shaft 58. The elevator belt is made up of a rear chain 193 and rotated about sprockets 192 and 196 and a front chain 193 carried on the sprockets arranged coaxially with the just recited sprockets. Carried between and by the elevator chain 192 and 193 are a plurality of elevator slats 197. These slats have fingers 198 which project upwardly through the space between the elevator bars 191. The elevator slats 197 slide on the two strips 199 held by the U-shaped cross pieces 189. After the crop drops from the shaker conveyor onto the elevator bars, the fingers 198 of the elevator slat 197 contact the crop and push the crop upwardly along on top of the elevator bars to discharge the crop from the elevator.

Figures 20, 21, 22 and 23 show another type of roller bar which may be used in this harvesting machine. This roller bar comprises a plurality of elongated conveyor members or bars 210, each having an angularly bent portion 211. A gear 212 is welded to the end of each bent portion 211. These gears 212 are journaled in a bearing block 215 in bearings spaced equidistant from each other and from the center of said block. The gears 212 are prevented from moving axially by a washer and a nut 214 on the threaded end portion 213 of each gear 212. The bearing block 215 is carried and supported by a hub 216 secured to the bearing block by capscrews 217. The hub 216 is rotatably mounted in a bearing bracket 218 and maintained therein by a spur gear 219 which is securely fixed on the upper end of the hub 216. Gear 219 is driven by gear 220 which is rotatably journaled on the stud 222. This stud is fixed in knob 223 which is a part of the bearing bracket 218. A bevel gear 221 is secured to the hub of the spur gear 220 and drives said spur gear 220. Bevel gear 221 may be driven by a bevel gear (not shown) on a suitably driven cross shaft provided on the machine.

Means must be provided to maintain the bars 210 in parallelism and to keep the bars pointed always in the same directions. To this end, a gear 224 is coaxially disposed in the bearing block 215 and in mesh with the gears 212 of the bars 210. A shaft 225 fixed to the gear 224 is journaled in the hub 216. A gear 226 pinned to the upper end of the shaft 225 is driven by gear 227 also fixed on the hub of the gear 220.

As all the gears 212 of the roller bars 210 are in constant mesh with the central gear 224, the bars 210 will circulate about each other in parallelism. Referring to Figure 21, the bearing block 215 is driven by gear 220 in a clockwise direction causing the gears 212 of the bars 210 to be bodily translated in a clockwise direction around the axis of the bearing block 215. The central gear 224 is also driven in a clockwise direction by its driving gear 227, and at the proper speed to maintain the bars 210 always pointed in the same direction. To this end, the gears 212 of the roller bars have fifteen teeth and the central gear 224 has twenty teeth. To maintain the roller bars always pointed in the same direction, central gear 224 must make one complete revolution plus that portion of a revolution which will revolve the roller bar gears 212 one complete revolution to every revolution of the bearing block 215. As the central gear has twenty teeth and the roller bar gears 212 have fifteen teeth, the central gear must make one and fifteen twentieths revolutions to one revolution of the bearing block. Therefore, the driving ratio between the spur gears 219 and 220, to the gears 227 and 226 must be one to one and fifteen twentieths. Gear 220 has fifteen teeth, gear 219 has twenty-one, gear 227 has sixteen and gear 226 has twenty. These gears have a ratio of one to one and fifteen twentieths and as the sum of the number of teeth in the lower gears 219 and 220 equals the sum of the number of teeth in the upper gears 226 and 227, gears 220 and 227 may turn about the same pin. Thus the roller bars 210 will have the same movement about each other as the roller bars 149 as has heretofore been described. Other combinations of gear sizes may be used besides the one just recited.

In operation the machine is pulled down the row of crop by any suitable tractor. The clevis 122 on the front end of the frame is hinged to the drawbar of the tractor and the machinery of the harvester rotates by the power take-off shaft of the tractor through a universal joint assembly 22 which is attached to the drive shaft 20 of the machine. The harvester is pulled down the row of crop so that the line where the puller chains RC and LC come together is in direct registry with the crop row. As the harvester advances down the crop row, the foliage of the crop is engaged between the endless puller chains RC and LC which exert a gradual upward pull on the foliage of the crop. Meanwhile the crop is loosened and pushed from the soil by the lifter shovels 70. As the crop is lifted from the soil it is carried rearwardly and upwardly with respect to the machines by the puller chains until the foliage reaches the roller bars whereupon the foliage of the crop is engaged between the two sets of roller bars and lifted up and fed rearwardly until the body of the root of the crop comes in contact with the lowermost sections of the contiguous sets of bars. The body of the crop is thus conveyed rearwardly to the cutting discs RK and LK. All of the beets are thus presented to the cutting means with the tops of their root portions in the same plane. The two sets of roller bars must be so spaced as to create only enough pulling effect on the crop to draw the crop upwardly but not sufficiently to break the foliage from the crop. Also the puller chains at the rear of the end of the pullers above the roller bars must be adjusted to hold the foliage of the crop lightly enough to permit the foliage to slide transversely in the puller chain when so urged by the roller bars to prevent breaking the foliage from the crop before the crop is presented to the cutters. Thus each of the crop will be uniformly presented to the cutters, regardless of the haphazard manner in which the foliage of the crop is grasped by the puller chains. The crop is now carried through the abutting edges of the oppositely disposed cutters RK and LK which sever the foliage and the crown or top portion of the crop from the body of the crop. The body of the crop falls into the shaker conveyor where the soil adhering to the crop is shaken loose and the loosened dirt separated from the crop. The crop is simultaneously conveyed into the elevator which carries the beets to a point where they may be discharged into a truck or wagon moving alongside the harvester.

After the crowns and foliage are severed from the crop, the foliage is discharged from the machine. In previous harvesters in which the roller bars were incorporated, the roller bar sets had bearing blocks at their rearmost ends which made necessary a certain amount of frame work and supports to carry the rear bearing blocks. The foliage with the attached crowns tended to follow the rotating gear bearing block of the roller bars and were continually falling upon the bearing block support until the foliage was tightly packed between the bearing blocks and their supports, which condition made it necessary to cease operation of the machine, until the foliage which had packed about the bearing block was removed manually. Such condition created a nuisance and reduced the capacity of the machine. In the new harvester the roller bar sets have no bearing block at their rearmost ends, hence the foliage is entirely free to fall from the machine as there are no bearing blocks to deflect the foliage or framework about which the foliage may become entangled. Thus the operation of the machine is improved and its capacity for work increased as the necessity for continually stopping the machine to remove the jammed foliage is abated.

Also, in the previous roller bar sets, which had a bearing block at each end of the bar, the bearings were more or less exposed to dirt and dust which caused wear in the bearing. Satisfactory lubrication of these bearings was difficult. In this new type of roller bar in which the bearing blocks are enclosed in a dust-proof housing, the bearings are protected from dirt and dust thus increasing materially the life of the roller bar unit. This type of roller bar is easily lubricated by a single injection of oil or grease into the housing 140 about the bearing blocks.

It is thought that the invention and numerous of its attendant advantages will be understood from the foregoing illustrative description and it is obvious that numerous changes may be made in the form, construction and arrangement of the several parts without departing from the spirit or scope of the invention or sacrificing any of its attendant advantages the form herein described being a preferred embodiment for the purpose of illustrating the invention.

The invention is hereby claimed as follows:

1. In an apparatus of the class described, an article conveyor comprising a plurality of elongated conveyor members, means for propelling said conveyor members in sequence in an orbital path whereby to impart propelling forces to conveyed articles in a direction extending longitudinally of the conveyor and also transversely thereof, said elongated conveyor members being supported wholly at one end, and means for maintaining said conveyor members in parallel alignment during their orbital movement, said maintaining means comprising a gear fixed to each of said elongated conveyor members, gearing interconnecting said gears, and means for driving said gearing at a predetermined speed to maintain the parallel relationship of the conveyor members.

2. In an apparatus of the class described, an article conveyor comprising a plurality of elongated conveyor members, means for propelling said conveyor members in sequence in an orbital path whereby to impart propelling forces to conveyed articles in a direction extending longitudinally of the conveyor and also transversely thereof, said elongated conveyor members being supported wholly at one end, and means for maintaining said conveyor members in parallel alignment during their orbital movement, said maintaining means comprising a rotatable bearing block in which the ends of the conveyor members are journaled, gears fixed, respectively, to the ends of each of said conveyor members, and a connecting gear mounted coaxially with the axis of rotation of the bearing block, and in meshing engagement with each of said first named gears.

3. In an apparatus of the class described, an article conveyor comprising a plurality of elongated conveyor members, means for propelling said conveyor members in sequence in an orbital path whereby to impart propelling forces to conveyed articles in a direction extending longitudinally of the conveyor and also transversely thereof, and means for maintaining said conveyor members in parallel alignment during their orbital movement, said maintaining means comprising a gear fixed to each of said elongated conveyor members, gearing interconnecting said gears, and means for driving said gearing at a predetermined speed to maintain the parallel relationship of the conveyor means.

4. In an apparatus of the class described, an article conveyor comprising a plurality of elongated conveyor members, means for propelling said conveyor members in sequence in an orbital path whereby to impart propelling forces to conveyed articles in a direction extending longitudinally of the conveyor and also transversely thereof, and means for maintaining said conveyor members in parallel alignment during their orbital movement, said maintaining means comprising a rotatable bearing block in which the ends of the conveyor members are journaled, gears fixed, respectively, to the ends of each of said conveyor members, and a connecting gear mounted coaxially with the axis of rotation of the bearing block, and in meshing engagement with each of said first named gears.

5. In a device of the class described, in combination with a first bearing block and a second bearing block having registering openings therein spaced concentrically about the centers of said bearing blocks, said bearing blocks being disposed in parallel planes, a plurality of cranks, each having heads at each end, one head disposed in an opening in one of said bearing blocks, and the opposite head disposed in a corresponding opening in the opposite bearing block with the intermediate portions of said cranks lying at an oblique angle to the parallel planes of said bearing blocks, said cranks lying in parallelism, means for rotating the first bearing block, and means for supporting the second bearing block for rotation in a plane parallel with the plane of rotation of the first mentioned bearing block, and a series of elongated roller bars rigidly carried by the ends of each head of the cranks supported in said second mentioned bearing block, said elongated bars being disposed at an acute angle with respect to the axes of their heads, the opposite ends of said elongated bars being free and unsupported.

6. In a device of the class described, in combination with a first bearing block and a second bearing block having registering openings therein spaced concentrically about the centers of said bearing blocks, said bearing blocks being disposed in parallel planes, a plurality of cranks, each having heads at each end, one head disposed in an opening in one of said bearing blocks, and the opposite head disposed in a corresponding opening in the opposite bearing block with the intermediate portions of said cranks lying at an oblique angle to the parallel planes of said bearing blocks, said cranks lying in parallelism, means for rotating the first bearing block, and means for supporting the second bearing block for rotation in a plane parallel with the plane of rotation of the first mentioned bearing block, and a series of elongated roller bars rigidly carried by the ends of each head of the cranks supported in said second mentioned bearing block, said elongated bars being disposed at an acute angle with respect to the axes of their heads, the opposite ends of said elongated bars being free and unsupported, and a dust-proof housing enclosing said cranks and bearing blocks.

7. In a device of the class described, in combination with a driven shaft, a first bearing block mounted on said shaft to rotate therewith, said bearing block having a series of spaced holes concentrically surrounding said shaft, a housing surrounding said shaft and first mentioned bearing block, a bearing ring carried by said housing, a second bearing block having a plurality of openings therein concentrically surrounding the axis of said second bearing block as said second bearing block rotates relatively to said housing, a plurality of cranks having their opposite ends provided with bearing heads disposed parallel to each other and offset from the axes of said cranks, the heads at one end of said cranks being mounted in the concentric openings in said first bearing block and the opposite heads of said cranks being disposed in the openings in said second bearing block, and a set of elongated roller bars disposed in parallelism and each having a head, each head being connected to one of the heads in said second mentioned bearing block, the opposite ends of said elongated bars being free and unsupported.

8. In a device of the class described, the combination of a pair of disc-like bearing blocks disposed with their planes in parallelism in spaced apart relation, a plurality of parallel cranks obliquely disposed relative to and between said bearing blocks with the ends of the cranks mounted in openings in said bearing blocks, means for rotating one of said bearing blocks about an axis centrally of said openings in said bearing block, and means for mounting the second bearing block for rotation about an axis centrally of the openings in that bearing block, a plurality of bearing heads connected to the cranks that are mounted in said mentioned bearing block, and a plurality of elongated roller bars, each carried at one end by one of the heads projecting from said second mentioned bearing block, said elongated bars being disposed in parallelism and movable in a closed path, the entire lengths of said bars from said one end being free and unsupported.

9. In an apparatus of the class described, in combination with a rotatable shaft, a housing surrounding said shaft, a driving head mounted on the end of said rotatable shaft and disposed within said housing, said driving head including a bearing block, a group of parallel disposed cranks disposed within said housing, each having one of its ends rotatably mounted in the rotatable bearing block, a second idler bearing block mounted in said housing and spaced from said first driving head bearing block, the opposite ends of said parallel cranks terminating in crank pins disposed in openings in said idler block and being rotatably mounted in said idler bearing block, said cranks being disposed angularly with respect to said first mentioned shaft, a group of elongated, parallel, bar-like elements each having an outwardly bent portion terminating in a bearing head, one to each of said last mentioned cranks, said idler bearing block being supported by said housing and said cranks and said elongated bars being free of support from said housing to the free ends of said elongated bars, and means for driving said first mentioned shaft whereby to cause said parallel bars to move in a closed path while being maintained in parallelism.

10. In a device of the class described, in combination with a drive shaft, a housing surrounding said drive shaft and projecting beyond one end thereof and angularly with respect thereto, a driving head mounted on the end of said shaft that projects into said housing, said driving head including a plurality of rotatable cranks disposed in spaced relation concentrically to the central axis of said first mentioned shaft, said cranks having parallel extensions disposed angularly with respect to the central axis of said drive shaft, a second bearing block mounted in said housing in spaced relation to said driving head, the opposite ends of said crank extensions having cranks rotatably mounted in said idler bearing block, and a plurality of parallel, elongated bars each having an angularly disposed crank at one end, one of said cranks of each bearing being connected to one of said last mentioned cranks mounted in said idler bearing block, said elongated bars being disposed angularly with respect to and substantially parallel to said first mentioned cranks, said elongated members being entirely free of support from said bearing block to their free ends.

11. Crop gathering instrumentalities comprising elongated crop engaging members arranged in opposed series, paired parallel bearing blocks for one end only of the members of each of said series, means for mounting the paired bearing blocks of each series in fixed relation to each other and with the axis of rotation for said blocks being at an oblique angle to the central longitudinal axes of said elongated members, crank means cooperating with said paired bearing blocks and said elongated members for maintaining the members of the opposed series in parallelism, said crank means including fixed connections for supporting said members wholly at one end with said members being otherwise free of support throughout their lengths, and drive means connected with said crank means and said bearing blocks for moving each of the members of said series in identical closed paths of travel.

12. Crop gathering instrumentalities comprising elongated crop engaging members arranged in opposed series, crank means fixedly connected at one end only to said elongated members for maintaining the members of each opposed series in parallelism and with the said elongated members being entirely free of support throughout the remaining lengths thereof, means for mounting said crank means and including spaced bearings having fixed axes of rotation disposed at an oblique angle to the longitudinal axes of said members, and drive means for rotating said crank means and bearings in unison with resultant movement of the elongated members of each series in identical closed paths of travel.

13. A crop positioning device for crop treating instrumentalities comprising two groups of roller bars adapted to be disposed in a substantially horizontal plane adjacent each other and extending in the same direction, combined means for driving and supporting each group of roller bars wholly at one end so that the remaining portions thereof are free to facilitate delivery of the crop, and including a rotatable bearing element having connecting elements journaled therein for mounting the adjacent ends of the said roller bars, and a drive connection with said connecting elements for positively maintaining the roller bars in parallel relationship during orbital movement thereof with said bearing element and preventing uncontrolled movement of the bars under the influence of gravity or the like.

14. A crop positioning device for crop treating instrumentalities comprising a group of roller bars adapted to be disposed in a substantially horizontal plane, combined means for driving and supporting each roller bar solely at one end so that the remaining portions thereof are free to facilitate delivery of the crop, and including a rotatable bearing element having connecting elements journalled therein for mounting the adjacent ends of said roller bars, and a drive connection with said connecting elements for positively maintaining the roller bars in parallel relationship during orbital movement thereof with said bearing element and preventing uncontrolled movement of the bars under the influence of gravity or the like.

15. A crop gathering instrumentality comprising a first crop handling mechanism, crop conveying and positioning means, and a second crop handling mechanism, said crop conveying and positioning means including a plurality of elongated roller bars, means solely at one end of said roller bars for supporting and maintaining said roller bars in parallel alignment, the other end of said roller bars being free, and means at said one end of the roller bars for propelling the roller bars in an orbital path while maintaining said roller bars in parallel alignment, said first crop handling mechanism being positioned to deliver crop members into contact with said roller bars at a point below said roller bars and beyond said supporting means and said propelling means, the free ends of said roller bars being positioned to convey the crop members to said second crop handling mechanism.

16. A crop gathering instrumentality comprising a first crop handling mechanism, crop conveying and positioning means, and a second crop handling mechanism, said crop conveying and positioning means including a plurality of elongated roller bars, means solely at one end of said roller bars for supporting and maintaining said roller bars in parallel alignment, the other end of said roller bars being free, and means at said one end of the roller bars for propelling the roller bars in an orbital path while maintaining said roller bars in parallel alignment, the free ends of said bars moving in a path symmetrical about the longitudinal axis of the conveyor when the roller bars are driven by said propelling means, said first crop handling mechanism being positioned to deliver crop members into contact with said roller bars at a point below said roller bars and beyond said supporting means and said propelling means, the free ends of said roller bars being positioned to convey the crop members to said second crop handling mechanism.

WILLIAM E. URSCHEL.

REFERENCES CITED

The following references are of record in the file of this patent:

UNITED STATES PATENTS

| Number | Name | Date |
| --- | --- | --- |
| 810,922 | Dickey | Jan. 30, 1906 |
| 1,041,003 | Binder | Oct. 15, 1912 |
| 1,236,021 | Varble | Aug. 7, 1917 |
| 1,268,085 | Bimson | June 4, 1918 |
| 1,445,449 | Ricks | Feb. 13, 1923 |
| 1,466,889 | Mortensen | Sept. 4, 1923 |
| 1,479,929 | Ricks | Jan. 8, 1924 |
| 1,792,529 | Bollmeier | Feb. 17, 1931 |
| 1,813,967 | Siemiana | July 14, 1931 |
| 1,894,802 | Urschel | Jan. 17, 1933 |
| 1,942,011 | Urschel | Jan. 2, 1934 |
| 2,183,631 | Urschel | Dec. 19, 1939 |
| 2,252,799 | Cooper | Aug. 19, 1941 |

FOREIGN PATENTS

| Number | Country | Date |
| --- | --- | --- |
| 3,339 | Holland | June 2, 1919 |

Certificate of Correction

Patent No. 2,562,400　　　　　　　　　　　　　　　　　　　　　July 31, 1951

WILLIAM E. URSCHEL

It is hereby certified that error appears in the printed specification of the above numbered patent requiring correction as follows:

Column 3, line 56, for "Patent No. 1,802,179" read *Patent No. 2,331,520*; column 7, line 70, for "transfering" read *transferring*; column 15, line 28, for "oppoiste" read *opposite*; column 18, list of references cited, under the heading "UNITED STATES PATENTS", add the following:

*387,598　　Raymond _____ Aug. 7, 1888* and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*